Sept. 29, 1931.    E. D. BARTON    1,825,612
FENDER ROPE FASTENER
Filed July 31, 1930
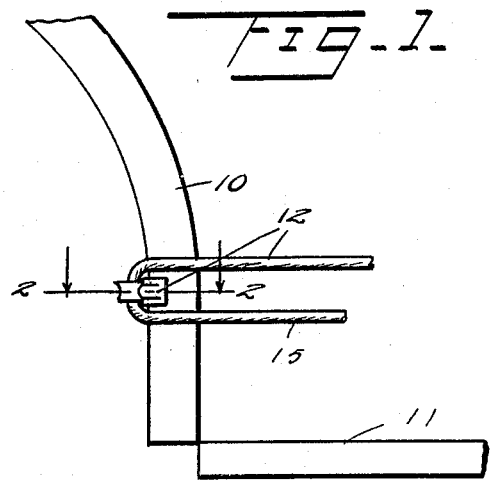
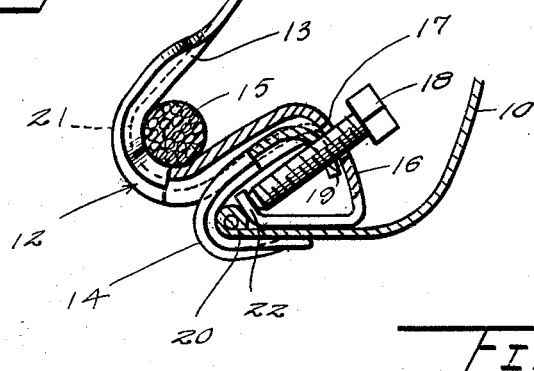
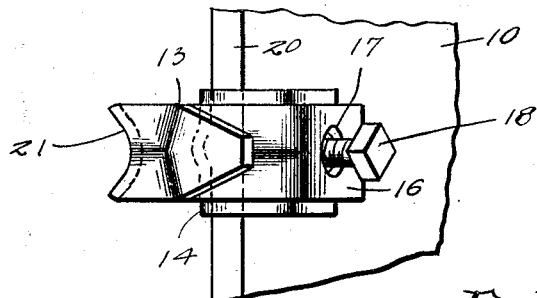
Inventor
E. D. Barton
By Watson E. Coleman
Attorney Patented Sept. 29, 1931

1,825,612

UNITED STATES PATENT OFFICE

EDWARD D. BARTON, OF FOUNTAIN, COLORADO

FENDER ROPE FASTENER

Application filed July 31, 1930. Serial No. 472,006.

The present invention relates to rope fastening means and more particularly to means for removably securing a rope to the fenders of a motor vehicle or the like.

An object of this invention is to provide a relatively simple hook which may be clamped to the present parts of a motor vehicle so as to permit the use of a rope for securing various articles, such as boxes, suit cases, or the like, to the running board of a motor vehicle.

Another object of this invention is to provide a device of this character which, when in mounted position, will not be unduly conspicuous, and which will not in any way injure or mar the finish of the vehicle.

A further object of this invention is to provide a device of this character which is of relatively simple construction, so as to permit the ready manufacture of the device in a cheap manner.

The above and various other objects and advantages of this invention will in part be described in and in part be understood from the following detailed description of the present preferred embodiment, the same being illustrated in the accompanying drawings wherein:—

Fig. 1 is a fragmentary side elevation of a vehicle fender and running board having a device constructed according to the preferred embodiment of this invention mounted thereon.

Fig. 2 is an enlarged sectional view taken on the line 2—2 of Fig. 1, and

Fig. 3 is a detail enlarged side elevation of the device.

Referring to the drawings wherein like numerals of reference designate corresponding parts throughout the several views, the numeral 10 designates generally a fender which is secured to a motor vehicle, and the numeral 11 designates a running board which is also mounted on a motor vehicle, the fender 10 and the running board 11 being of conventional construction.

At the present time numerous luggage carriers of various kinds are available which may be removably attached to the running board of the vehicle, but most of the luggage carriers are so constructed that a relatively long package cannot be readily mounted on the running board and held against lateral movement with respect to the body of the vehicle.

In order to provide a relatively simple means for securing packages or elements to the running board 11, I have provided a fender clamp generally designated as 12, which is preferably used in pairs, one clamp 12 being secured to one fender and another clamp being secured to the other fender of the same side of the vehicle, but if desired, any number of pairs of clamps may be used; the clamps 12 being provided with a fixed hook member 13, and a movable clamping member 14.

The hook 13 is provided with a free, reverted outer end portion which is adapted to receive a flexible element 15, in the form of a rope or the like. The hook member 13 comprises an inner fixed clamping portion 16 which is substantially U-shaped in form, and provided with a recess 17 for loosely receiving a securing bolt 18, the securing bolt 18 being threadably mounted in the inner end portion 19 of the movable clamping member 14.

The clamping portion of the device herein disclosed is substantially triangular in shape and the member 16 is adapted at the closed end thereof to engage against the fender 10, and one of the ends thereof is relatively short or restricted and engages against the beaded edge 20 of the fender 10.

The hook portion 13 of the fixed clamping member is preferably arcuate in cross section, the concave portion thereof being positioned on the outer edge, as at 21, and in like manner the fixed clamping member 14 is provided with a longitudinal bead substantially in the center thereof, the bead being adapted to be positioned in the concave portion 21 of the hook member 13, so as to prevent lateral movement of the fixed clamping member 13 with respect to the movable clamping member 14.

The inner end of the bolt 18 is adapted to engage against the restricted end 22 of the fixed clamping member 16, and the rotation of the bolt 18 will move the movable clamping member 14 toward or away from the fixed clamping member 16, so as to clamp the device on the fender 10, or permit removal from the fender.

It will be obvious from the foregoing that any number of hook members 12 may be secured to the fenders of the motor vehicle and that when they are positioned on the fenders of the vehicle the rope or flexible member 15 may be stretched between the fenders, being looped about the portion 13, which preferably extends inwardly of the outer face of the fender 10, so that it will not protrude or project outwardly of the fender where it might readily be injured by a passing vehicle or the like.

It is, of course, understood that various changes and modifications may be made in the details of construction and design of the above specifically described embodiment of this invention without departing from the spirit thereof, such changes and modifications being restricted only by the scope of the following claims:—

What is claimed is:

1. A clamp of the character described comprising a fixed hook member, a movable clamping member, means for holding said movable clamping member against lateral movement with respect to said fixed clamping member, said means comprising a groove in said fixed hook member and a bead on said movable member slidably engaging in said groove, and a threaded bolt rotatably carried by said fixed member and threadably engaging said movable member.

2. A fender clamp of the character described comprising a fixed clamping member having an upturned end portion, a hook secured to said fixed clamping member, a movable clamping member, and a bolt rotatably carried by said fixed clamping member and threadably mounted in said movable clamping member and engaging said upturned end portion.

In testimony whereof I hereunto affix my signature.

EDWARD D. BARTON.